United States Patent [19]

Blake

[11] 4,294,278
[45] Oct. 13, 1981

[54] PRESSURE MODULATING VALVE

[75] Inventor: William W. Blake, Kewanee, Ill.

[73] Assignee: Caterpillar Tractor Co., Peoria, Ill.

[21] Appl. No.: 110,712

[22] PCT Filed: Dec. 14, 1979

[86] PCT No.: PCT/US79/01129

§ 371 Date: Dec. 14, 1979

§ 102(e) Date: Dec. 14, 1979

[87] PCT Pub. No.: WO81/01733

PCT Pub. Date: Jun. 25, 1981

[51] Int. Cl.³ .............................................. F16K 11/10
[52] U.S. Cl. .................................. 137/115; 137/118; 137/494
[58] Field of Search ............... 137/488, 491, 494, 118, 137/469, 115

[56] References Cited

U.S. PATENT DOCUMENTS

| | | | |
|---|---|---|---|
| 3,137,311 | 6/1974 | Rohweder | 137/495 |
| 3,468,194 | 9/1969 | Horsch | |
| 3,570,522 | 3/1971 | Horsch | 137/494 X |
| 3,739,807 | 6/1973 | Landrus | 137/494 X |
| 3,802,460 | 4/1974 | Grosseau | 137/494 |
| 3,882,980 | 5/1975 | Blake | 137/595 X |
| 3,960,172 | 6/1976 | Blake | 137/504 |
| 3,990,553 | 11/1976 | Holzinger | |
| 4,013,093 | 3/1977 | Pensa | 137/491 |

*Primary Examiner*—Alan Cohan
*Attorney, Agent, or Firm*—Phillips, Moore, Weissenberger, Lempio & Majestic

[57] ABSTRACT

A pressure modulating valve 28 has a principal use for retrofitting into an original hydraulic system (10) to modulate the fluid pressure from a source (11) of hydraulic fluid to hydraulic clutches (50, 52) in a transmission (54). In prior art valves, the routing of hydraulic fluid from the original system to the valve involved the connection of many lines. The present invention is connected to the source (11) at only one location and discharges fluid to the clutches from said location. The valve (28) is operated by the fluid provided at the one location without the need to route fluid around the valve (28) to the various components thereof. The valve (28) also modulates the fluid supplied to the clutches from a low pressure to a high pressure to provide smooth clutch engagement.

15 Claims, 6 Drawing Figures

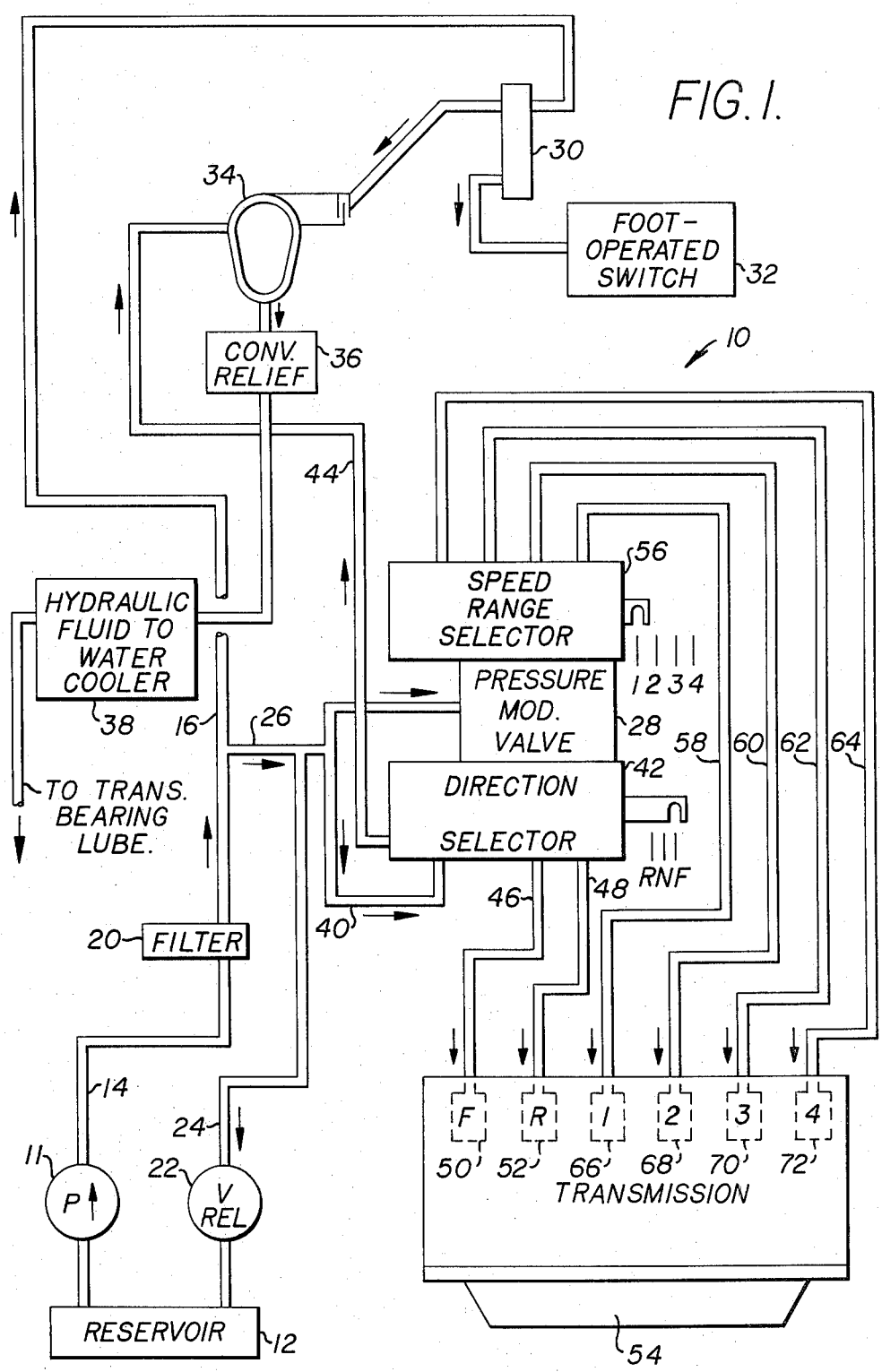

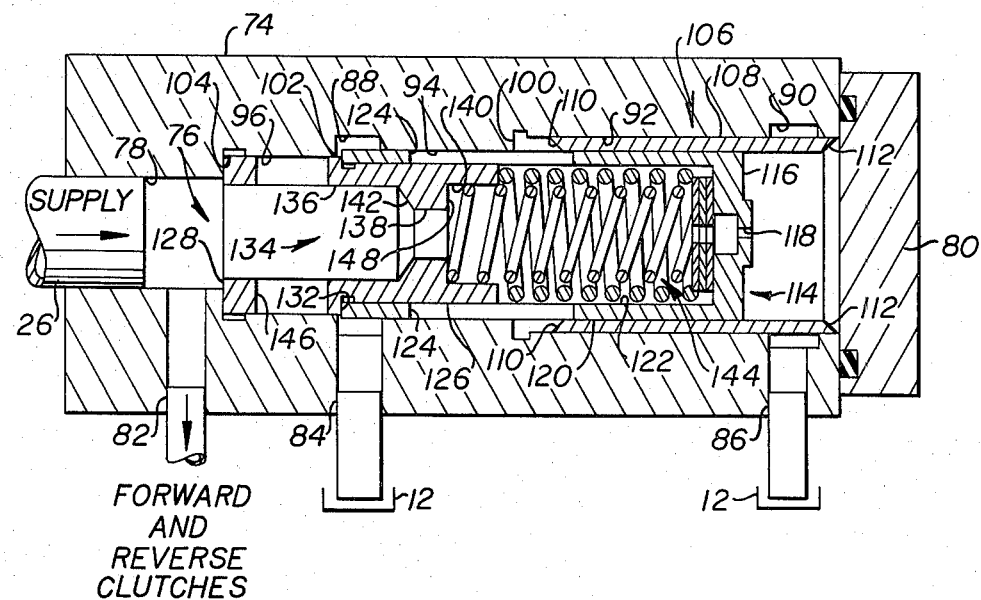
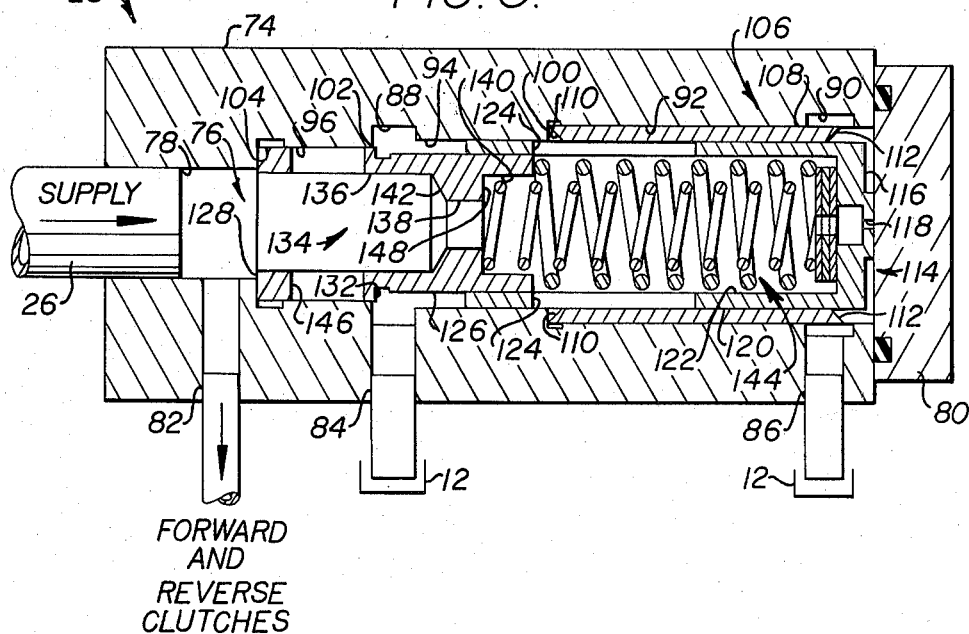

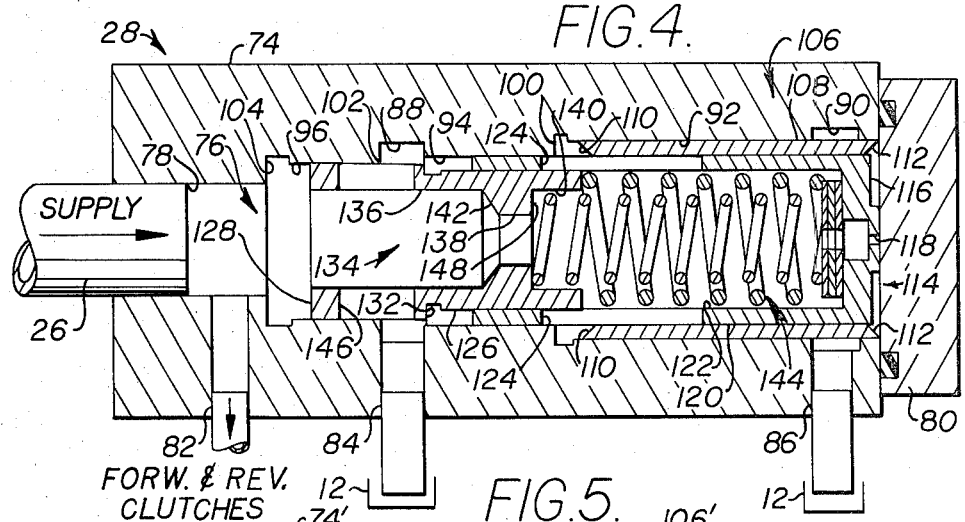
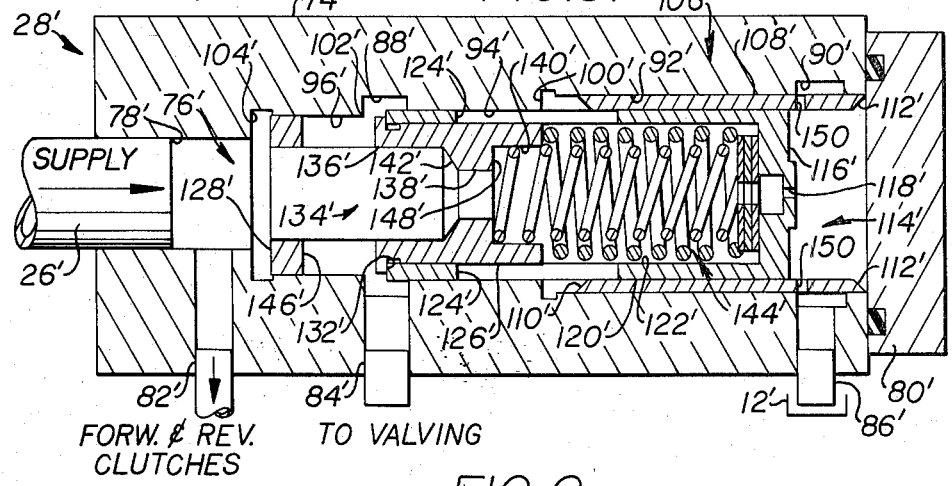
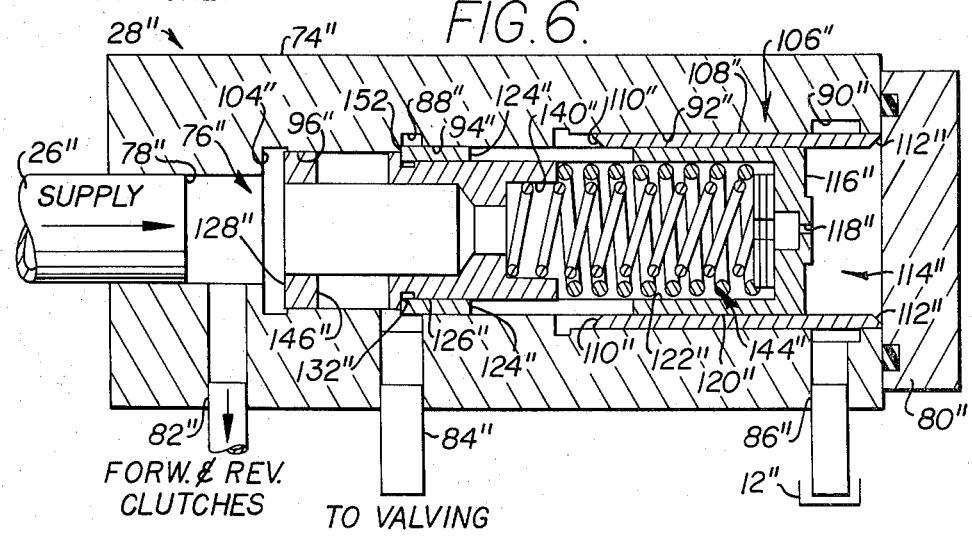

PRESSURE MODULATING VALVE

DESCRIPTION

1. Technical Field

This invention relates to pressure modulating valves and, in particular, to valves for the hydraulic control system of a vehicle transmission which modulate the hydraulic pressure to the clutches of the transmission from a very low to a higher pressure.

2. Background Art

As is fully discussed in U.S. Pat. No. 3,960,172 issued to William W. Blake on June 1, 1976, hydraulic systems are generally used to control multispeed transmissions which require drive engaging devices, such as clutches or brakes, for each speed range and each direction. The selection of each speed range and each direction requires the energization of one clutch or brake and the de-energization of another clutch or brake. Generally, forward and reverse directional clutches are designed as main clutches that absorb the shocks associated with the transmissions of power through the drive shaft of the vehicle. These clutches are, consequently, of heavier construction than the speed clutches. Accordingly, excessive wear is avoided on the several speed selecting clutches, which clutches can then be of smaller and more economical construction.

In such systems, there is a need to improve modulation valves to provide smooth shifting between the various speeds and directions. Also, there is a need to provide a modulation valve which can be retrofitted into an existing system and which allows the pressure to start from a very low value and smoothly increase to the pressure desired. There is a further need to have said retrofitting accomplished with a minimum of additional routing of hydraulic fluid. Further, there is a need for a modulating valve which provides for rapid reset to a minimum pressure condition once a new speed or direction has been selected. Also, it is desirable to have a modulation valve with large diameter orifices which, unlike smaller diameter orifices, do not have a tendency to become clogged by the hydraulic fluid, retarding the efficiency of the valve, and thus decreasing the smoothness of speed or directional shifting. Further, the modulating valve should be adaptable for incorporation into an original transmission control system.

DISCLOSURE OF THE INVENTION

The present invention is directed to overcoming one or more of the problems as set forth above.

In one aspect of the present invention, a modulating valve with an axial passage comprises a relief valve spool mounted in a first end portion of the passage and a load piston mounted in a second end portion of the passage and resilient means interconnecting the spool and piston. The modulating valve further includes a pressure operated checkvalve means for selectively relieving the pressure in said second end portion, means for communicating the first end portion with the second end portion, and means for communicating the pressure operated check valve means with the first end portion.

In another aspect of the invention the relief valve spool defines an axial passage, the means for communicating the pressure operated check valve means with the first end portion includes a slot defined by said load piston, and the means for communicating the first end portion with the second end portion includes an orifice defined by said load piston.

In yet another aspect of the present invention, a relief port is provided in the pressure operated check valve for providing continual fluid relief.

In still another aspect of the invention, a stop is provided in the housing for the valve for preventing the piston from urging a slot defined by the spool out of fluid communication with a discharging passage defined by the housing.

Thus, in one aspect of the invention the pressure modulating valve provides a relief valve spool with a bore and a load piston with an orifice and communication means which allows hydraulic fluid to flow through and operate the valve without the necessity of routing fluid around the modulating valve to the spool, piston and check valve. Consequently, the present invention can be quickly retrofitted into existing hydraulic systems with a minimum of additional routing of hydraulic fluid.

As original equipment in a system, the modulating valve, through either the stop or the relief port, can provide for continual fluid passage through the modulating valve to downstream equipment other than the clutch without interfering with the modulation of fluid to the clutch.

The present pressure modulating valve provides for gradual clutch and brake modulation from a very low pressure to a higher pressure to place the vehicle in motion. With such an arrangement, the brake and clutch are not required to absorb the shock associated with such prior art apparatus during the shifting operation.

Further, the present invention provides for rapid reset to a minimum pressure condition, and allows for an orifice in the load piston which does not have a tendency to become clogged.

BRIEF DESCRIPTION OF THE DRAWINGS

FIG. 1 depicts a schematic diagram of a hydraulic control system for a vehicle transmission which incorporates an embodiment of the pressure modulating valve of the present invention.

FIG. 2 depicts a cross-sectional view of the embodiment of the pressure modulating valve of the invention in a full pressure setting.

FIG. 3 depicts the embodiment of the pressure modulating valve of the invention in the minimum pressure setting.

FIG. 4 depicts the embodiment of the invention in an intermediate pressure setting.

FIG. 5 depicts an alternative embodiment of the pressure modulating valve of the invention.

FIG. 6 depicts still another embodiment of the pressure modulating valve of the invention.

BEST MODE FOR CARRYING OUT THE INVENTION

Shown in FIG. 1 is a schematic of a representative hydraulic control system 10 for a multispeed transmission. A pump 11 draws fluid from a sump 12 and directs this fluid to a conduit 14. Conduit 14 branches into conduits 16 and 26. Conduit 14 has a hydraulic fluid filter 20 located therein. A relief valve 22 is provided in a conduit 24, which conduit connects sump 12 and conduit 26. Conduit 26 provides fluid communication to the pressure modulating valve 28 of the invention. Relief valve 22 maintains the pressure of the fluid in conduit 26 at a desired level. It is to be noted that the direction of fluid flow in the hydraulic control system 10 is indicated by the arrows provided on FIG. 1.

Further to the hydraulic control system 10, conduit 16 communicates with a sequence and pressure control valve 30 which is operated by a foot operated switch 32. A torque converter 34 is provided in fluid communication with the sequence and pressure control 30. From the torque converter 34, the fluid flows through a converter outlet relief valve 36 and through a hydraulic fluid water cooler 38, and flows therefrom to provide transmission bearing lubrication. Branching from conduit 26 is an additional conduit 40 which provides fluid communication to the direction selector 42. A conduit 44 provides communication between direction selector 42 and torque converter 34. Conduits 46 and 48 provide fluid communication between direction selector 42 and the forward and reverse clutches 50 and 52, respectively, of transmission 54. A conduit, not depicted, provides communication for fluid flow from the pressure modulating valve 28 to the direction selector 42.

A speed range selector 56 is also provided in fluid communication with direction selector 42 by means of conduits not depicted. Further, conduits 58, 60, 62 and 64 provide fluid communication between speed range selector 56 and first speed clutch 66, second speed clutch 68, third speed clutch 70, and fourth speed clutch 72, respectively, of transmission 54.

Turning to FIG. 2, a sectional view of pressure modulation valve 28 of the invention is depicted. It is to be understood that valve 28 has been designed as described herein to be retrofitted into system 10. Valve 28 includes a cylindrical housing which defines an axial passage 76. One end of axial passage 76 defines a charging port 78 which is provided in fluid communication with a supply conduit 26. The other end of axial passage 76 is sealed by end plate 80. A first discharging port 82 is defined by housing 74 and communicates with charging port 78. Second and third discharging ports 84 and 86, respectively, are provided in housing 74, which ports communicate with sump 12. Third discharging port 86 is located adjacent end plate 80 and second discharging port 84 is located intermediate the first and third discharging ports. Second and third discharging ports 84 and 86 communicate respectively with annular channels 88 and 90 which are provided about and communicate with axial passage 76.

Axial passage 76 is comprised of three communicating and co-linearly stepped bores 92, 94 and 96, respectively. Bore 92 is located adjacent end plate 80 and has a diameter which is larger than bore 94. Bore 94 is located intermediate bores 92 and 96 and has a diameter which is larger than bore 96. Bore 96 communicates with charging port 78 and has a larger diameter than said port. In addition, annular shoulders 100, 102 and 104 define the border between bores 92 and 94, bores 94 and 96, and bore 96 and port 78, respectively. Annular channels 88 and 90 communicate with bores 94 and 92, respectively.

Slidably mounted in passage 92 is a pressure operated check valve 106 which defines a cylindrical sleeve 108. First and second ends 110 and 112 are beveled toward the inside of sleeve 108. A load piston 114 is slidably disposed within cylindrical sleeve 108 and also within passage 94. Load piston 114 includes an end portion 116 provided adjacent end plate 80. End portion 116 defines an axial cavity 122. Cylindrical sleeve 120 defines a plurality of radial slots 124 thereabout.

Slidingly disposed within cylindrical sleeve 120 is a first portion 126 of a relief valve spool 128. A second cylindrical portion of spool 218 is slidingly disposed in bore 96. The diameter of the first cylindrical portion is less than the diameter of the second cylindrical portion and an annular shoulder 132 is provided therebetween. Cylindrical sleeve 120 of piston 114 is slidable into contact with annular shoulder 132.

An axial passage 134 is defined by spool 128. Passage 134 includes first, second and third bores 136, 138 and 140, respectively. Bore 136 has a diameter which is larger than a diameter of bore 138 and a beveled shoulder 142 is defined by axial passage 134 between bores 136 and 138. Bore 140 has a diameter which is larger than bore 138 and a shoulder 148 is defined by axial passage 134 between bores 138 and 140. Spool 128 defines a plurality of radial slots 146 thereabout. Radial slots 146 communicate with bore 96 and bore 136.

A set of coaxial springs 144 is provided between load piston 114 and spool 128. One end of one of said springs 144 is received in bore 140 of spool 128 and abuts shoulder 148. The end of the adjacent spring abuts spool 128. The opposite ends of springs 144 are received within the cylindrical sleeve 120 of piston 114 and abut end portion 116.

INDUSTRIAL APPLICABILITY

The operation of pressure modulating valve 28 is as follows. As depicted in FIG. 2, pressure modulating valve 28 is in the steady state, full pressure position. In said full pressure position, a constant, maximum pressure is supplied through directional selector 42 to one of the directional clutches 50 or 52. If desired, pressure modulating valve 28 could modulate the fluid through the speed range selector 56 to the speed clutches in a manner similar to that described here. In the full pressure setting, pressure operated check valve 106 completely blocks third discharging port 86. Second discharging port 88 is blocked by load piston 114 and spool 128 as load piston 114 contacts shoulder 132 of said spool and urges said spool against shoulder 104 of passage 76.

Upon the selection of a different clutch by the direction selector 42, pressure modulation valve 28 resets to the minimum pressure setting as depicted in FIG. 3. In a preferred embodiment, this resetting occurs quite rapidly, generally on the order of 1/100 of a second. Upon selection of the different clutch, the pressure at charging port 78 of axial passage 76, passage 134 of spool 128, axial cavity 122 of load piston 114, radial slots 124, and the cavity defined between shoulder 100 and check valve 106 drops to substantially zero. Springs 144, which in a preferred embodiment, exert a spring force of 5 psi, act on load piston 114, urging said piston toward end plate 80 of housing 74 as shown in FIG. 3. An increased pressure is created in the cavity defined between load piston 114 and end plate 80. This pressure acts on the beveled end 112 of pressure operated check valve 106 and urges said check valve toward shoulder 100. Thus, third discharging port 86 is opened, relieving the pressure in the cavity defined between the load piston and the end plate of the housing. In the minimum pressure setting, load piston 114 abuts end plate 80, as the fluid contained therebetween has been drained through third discharging port 86.

Once the new clutch is filled, the pressure at charging port 78 begins to increase, forcing the relief valve spool 128 to move toward the end plate 80 (FIG. 4). Fluid pressure is exerted against the end of spool 128 adjacent port 78. As spool 128 moves towards end plate 80, radial slots 146 thereof come into fluid communication with second discharging port 84, allowing fluid to drain to sump 12. The spring force on relief valve spool 128 determines the pressure at port 78. Thus, with a spring force of 5 psi, the pressure is also a low 5 psi. This pressure is transmitted through axial passage 134 of spool 128 to the axial cavity 122 of load piston 114, and through the radial slots 124 of the piston to the first beveled end of check valve 106. As the second beveled end 112 of check valve 106 is opened to the third discharging port 86, the resulting force on pressure operated check valve 106 causes said valve to move toward end plate 80, closing the third discharging port 86.

Pressurized fluid flows through axial orifice 118 of piston 114 into the cavity defined between piston 114 and end plate 80, which cavity, as has been indicated above, no longer communicates with third discharging port 86. As the area of load piston 114 exposed to fluid pressure is greater on the side of piston 116 adjacent end plate 80 than on the side adjacent the axial cavity 122 and as load piston 114 is exposed to zero fluid pressure at second discharging port 84, a net resultant force urges load piston 114 away from end plate 80 toward the end of housing 74 defining charging port 78. As load piston 114 moves away from end plate 80, the spring force on relief valve spool 128 is increased urging relief valve spool 128 toward charging port 78. As spool 128 moves toward port 78, flow through discharging port 84 is increasingly restricted causing the clutch pressure delivered through first discharging port 82 to increase. Eventually, the end of the cylindrical sleeve 120 of load piston 114 abuts the shoulder 132 of spool 128, urging spool 128 abuttingly against the shoulder 104 of the axial passage 78 of the housing with the resultant blocking of second discharging port 84. So positioned, the maximum desired pressure is provided to the first discharging port 82, and thus to the clutches (FIG. 2).

ALTERNATIVE EMBODIMENTS

An alternative embodiment of the pressure modulating valve is depicted in FIG. 5 and denoted 28'. Components of pressure modulating valve 28' which are identical to the components of pressure modulating valve 28 of FIG. 2 are given corresponding primed numerical designations.

Pressure modulating valve 28' is designed for use with an original system, and not as an addition to an existing system, that being the purpose of pressure modulating valve 28. As such, the second discharging port 84' would not be communicating with a sump as does port 84 of the valve 28, but instead would communicate with some downstream valving. Thus, it is desirable that relief valve spool 128' not completely block the second discharging port with pressure modulating valve 28' in the full pressure setting. To accomplish this end, and as explained below, sleeve 108' of pressure operated check valve 106' includes a plurality of radial ports 150 thereabout. Radial ports 150 are located adjacent the second beveled end 112' of the check valve.

The operation of the alternate embodiment of the pressure modulation valve 28' is similar to valve 28 except for the following. From the intermediate pressure setting as depicted in FIG. 4 for the pressure modulating valve 28, piston 114' is urged towards and eventually contacts the shoulder 132' of spool 128', as occurs in the operation of valve 28. As piston 114' continues to move toward port 78', spool 128' is urged toward port 78'. Piston 114' moves past and eventually exposes radial ports 150 of pressure operated check valve 106. Thus, the cavity defined between piston 114' and end plate 80' is placed in fluid communication with third discharging port 86'. Ports 150 are sized such that the forces acting on load piston 114' urging it towards port 78' are equalized by the forces on piston 114' urging it toward end plate 80'. Thus, load piston 114' and spool 128' becomes stationary such that the radial slots 146' are still provided in fluid communication with second discharging port 84' and thus, fluid is provided from the source to the valving through third discharging port 84'.

Still another alternative embodiment of the pressure modulation valve can be found in FIG. 6 and designated 28". As is pressure modulation valve 28', valve 28" is designed for incorporation as original equipment in a hydraulic transmission control system. Thus, fluid from the source must at all times flow through the second discharging port 84" to valving. To accomplish this, spool 128" must not completely block fluid communication between the source and second discharging port 84". This can be accomplished by providing a block 152 in the axial passage 76" to limit the movement of load piston 114" toward supply conduit 26". With the movement of load piston 114" so limited, the radial slots 146" of spool 128" are not urged out of fluid communication with the second discharging port 84". Thus, fluid is supplied through discharging port 84" to additional valving of the system.

As is evident from the above disclosure, the pressure modulating valve provides fluid modulation to the clutches from a very low pressure, for example, 5 psi, to high pressures to smoothly place the vehicle in motion. Further, owing to the large diameter of the check valve, fast load piston reset is accomplished at the minimum pressure of approximately 5 psi provided by the springs. Further, owing to its concentric nature, the pressure modulating valve incorporates compactness of size with simplicity of hydraulic fluid routing. Also, pressure in the spring cavity tends to counteract the pressure in the cavity between the load piston and plate 80, and allows a larger diameter load piston axial orifice to be used than is normal for the given load piston stroke. Thus, the possibility that the orifice might become clogged with hydraulic fluid is greatly reduced. If, however, a smaller orifice is used, then the length of the stroke of the load piston can be reduced and the pressure modulation valve made even more compact.

Other aspects, objects and advantages of this invention can be obtained from a study of the drawings, disclosure, and the appended claims.

I claim:

1. In a modulating valve (28) having an axial passage (76), with a first end portion (96) and a second end portion (92), the improvement comprising:
  a relief valve spool (128) mounted in said axial passage (76) adjacent the first end portion (96);
  a load piston (114) mounted in said axial passage (76) adjacent the second end portion (92);
  resilient means (144) for interconnecting said spool (128) and said load piston (114);
  a pressure operated check valve means (106) for selectively relieving the pressure in said second end portion (92), which check valve means (106) is slidably mounted about said load piston (114);

means (124) for communicating the first end piston (96) with the second end portion (92); and means (118) for communicating the pressure operated check valve means (106) with the first end portion (92).

2. In a modulating valve (28) having an axial passage (76), with a first end portion (96) and a second end portion (92), the improvement comprising:

a relief valve spool (128) mounted in said axial passage (76) adjacent the first end portion (96);

a load piston (114) mounted in said axial passage (76) adjacent the second end portion (92);

resilient means (144) for interconnecting said spool (128) and said load piston (114);

a pressure operated check valve means (106) for selectively relieving the pressure in said second end portion (92);

means (124) for communicating the first end portion (96) with the second end portion (92) including another axial passage (134) defined by said relief valve spool (128) which communicates the first end portion (96) with said load piston (114), and also including an orifice (118) defined by said load piston (114) and means (118) for communicating the pressure operated check valve means (106) with the first end portion (92) including a slot (124) defined by said load piston (114).

3. In the modulating valve (28) of claim 2 having a housing (74) the improvement further including the housing (74) defining a discharging passage (84) and said spool (128) defining a slot (146) which communicates with the another passage (134) and which is selectively communicable with said discharging passage (84).

4. In a modulating valve (28), the improvement comprising:

a relief valve spool (128) having a passage (134);
a load piston (114) having an orifice (118);
resilient means (144) for interconnecting said spool (128) and said load piston (114);
a pressure operated check valve (106) mounted slidably about said load piston (114); and
said load piston (114) defining means (122, 124) for communicating the check valve (106) with the passage (134) of the spool (128).

5. The modulating valve (28) of claim 4 including a housing (74) defining a discharging passage (84) and wherein said spool (128) defines a slot (146) which communicates with the passage (134) and which is selectively communicable with said discharging passage (84).

6. The modulating valve (28) of claim 4 including a housing (74) defining a discharging passage (86) in fluid communication with said orifice (118); and
wherein said pressure operated check valve (106) has means (180) for selectively blocking said discharging passage (86).

7. The modulating valve (28) of claim 4 including a housing (74) defining a charging port (78) and an adjacent discharging port (82) and means (76) for communicating said ports (78, 82) with said spool (128).

8. The apparatus of claim 4 wherein the check valve (102) includes a sleeve (108) and wherein the means (122, 124) for providing fluid communication between the passage (134) and the pressure operated check valve (106) includes a slot (124) provided in the load piston (114).

9. The apparatus of claim 4 wherein said pressure operated check valve (106) defines a relief port (150).

10. The apparatus of claim 5 including stop means (152) for allowing the slot (146) to always communicate with said discharging passage (84).

11. In a modulating valve (28), the improvement comprising:

a valve housing (74) defining a bore (76), a charging passage (78) communicating with said bore (76), and first, second and third discharging passages (82, 84, 86) communicating with said bore (76);

a pressure operated check valve means (106) for selectively opening and closing the third discharging passage (86);

a piston (114) slidably mounted in the bore (76), the piston defining an orifice means (118) for communicating with the third discharging passage (86), and means (124) for providing fluid communication between the bore (76) and the check valve means (106), wherein said check valve means (106) is slidably mounted about said piston (114);

a spool (128) slidably mounted in said bore (76) and defining a passage (134), and a slot (146) which communicates with the passage 134), which slot (146) is selectively slidable into fluid communication with the second discharging passage (84); and resilient means (144) for urging the spool (128) and the piston (114) away from each other.

12. The apparatus of claim 11 wherein said pressure operated check valve means (106) defines a relief port (150).

13. The apparatus of claim 11 including stop means (152) for preventing the slot (146) of the spool (128) from being urging out of fluid communication with the second discharging passage (84).

14. The apparatus of claim 11 wherein said charging passage (78) and said first discharging passage (82) communicate with one end of said bore (76), said third discharging passage (86) communicates with the other end of said bore (76), and said second discharging passage (84) communicates with said bore (76) intermediate said first (82) and said third (86) discharging passages.

15. A hydraulic system (10) for modulating fluid under pressure comprising a source (11) of pressurized fluid;
a load (54);
a relief valve spool (128) having a passage (134) which communicates with the source (11) and the load (54);
a load piston (114) having an orifice (118);
resilient means (144) for interconnecting said spool (128) and said piston (114);
a pressure operated check valve (106) mounted slidably about said load piston (114); and
said load piston (114) defining means (122, 124) for communicating the pressure operated check valve (106) with the passage (134) of the spool (128).

* * * * *